Feb. 20, 1968   H. HORA   3,370,172
ARRANGEMENT FOR PRODUCING TWO-DIMENSIONAL IMAGES OF AN
INFRA-RED RADIATOR
Filed June 24, 1964   2 Sheets-Sheet 1
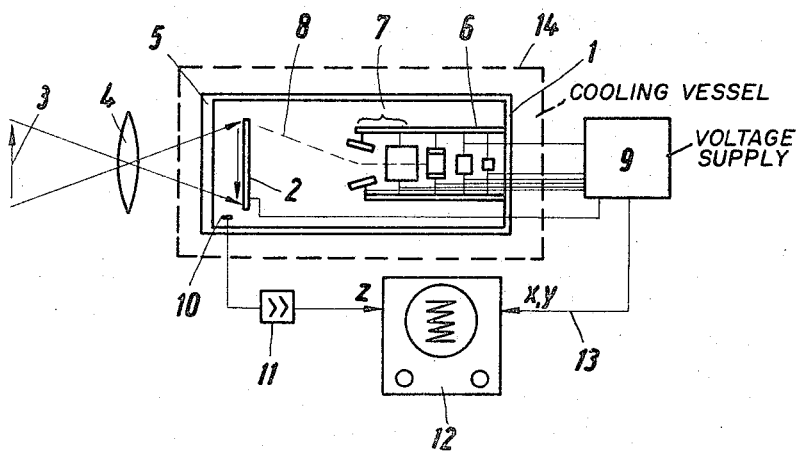
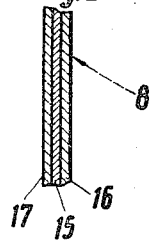 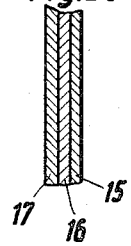 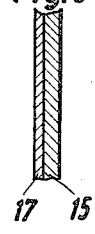 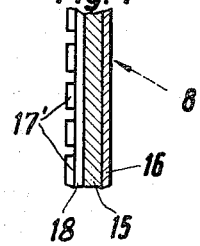
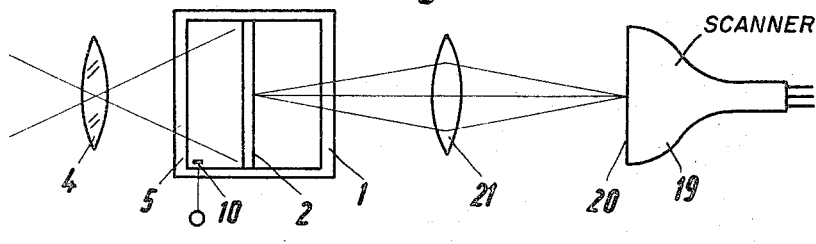
Inventor:
HEINRICH HORA
by: *Stephen H. Frishauf*
ATTORNEY United States Patent Office 3,370,172
Patented Feb. 20, 1968

3,370,172
ARRANGEMENT FOR PRODUCING TWO-DIMENSIONAL IMAGES OF AN INFRA-RED RADIATOR
Heinrich Hora, Garching, Germany, assignor to Institut für Plasmaphysik Gesellschaft mit beschränkter Haftung, Munich-Garching, Germany
Filed June 24, 1964, Ser. No. 377,590
Claims priority, application Germany, June 27, 1963, J 23,969
12 Claims. (Cl. 250—83.3)

ABSTRACT OF THE DISCLOSURE

A multi-alkali type photocathode is cooled to a temperature range in which the quantum yield of photoelectrons, emitted thereby upon impingement of supplementary optical radiation, is strongly dependent on temperature; and image-originated radiation is directed on the cathode, changing its temperature so that the yield of photoelectrons as caused by the supplementary radiation is sharply modified by the selective heating due to projected image radiation.

---

The present invention relates to a system for producing two-dimensional images of an infra-red radiator, preferably in the far infra-red region.

In the longer wave portion of the infra-red spectrum, measurement of radiation based on quantum effects is not possible due to the very low energy of the quanta in this portion of the spectrum. Consequently, for this part of the spectrum radiation receivers take the form of devices which respond to the heat produced by the radiation it is desired to measure. Examples of these are bolometers, pneumatic receivers and thermocouples. However, these receivers are not suitable for the production of two-dimensional images of an infra-red radiator.

Again, it is known that specific photocathodes, e.g. multi-alkali cathodes of the $(Cs)Na_xK_{3-x}Sb$ type, exhibit abnormally high temperature dependence of the quantum yield for specific photon energies in certain temperature ranges (see the "Zeitschrift für Naturforschung" volume 15a, edition 11, 1960, pages 1014 to 1016). Also known are systems for measuring the intensity of infra-red radiation, which exploit this effect (German Patent 1,137,876). These systems employ a multi-alkali cathode of the $(Cs)Na_xK_{3-x}Sb$ type, which, during operation, is bombarded by constant additional radiation having a photon energy of about 2 e.v., and maintained at a temperature near $-150°$ C. by a cooling system. The temperature may be set to a value for which the quantum yield is maximum where the supplementary radiation is concerned, so that any heating of the cathode by the infra-red radiation it is desired to detect shifts the working point of the cathode on the quantum yield/temperature characteristic into a region in which the quantum yield falls off very rapidly with increasing temperature. The number of photoelectrons liberated from the photocathode by the supplementary radiation is then inversely proportional to the degree of heating of the photocathode by the infra-red radiation. Obviously, it would be equally possible to work at the other side of the point of maximum intensity, however, in this case the quantum yield is not as closely dependent upon the temperature as it is in that part of the quantum yield/temperature characteristic which falls off steeply after the maximum with increasing temperature.

Also known is a whole series of systems suitable for converting images in the visible spectrum or near infrared into electrical signals. Examples of these are the well known television camera tubes such as iconoscopes, image-orthiocons, vidicons and so on, as well as image-converter tubes which contain a photocathode responsive to the radiation it is desired to convert, this cathode producing an electron image which is displayed upon a luminescent screen by electron-optical means, the screen producing a visible which can be observed or photographed. The foregoing systems are suitable for spot-scanning if the applied voltages are suitably controlled so that a sequential signal similar to a television signal can be produced; they are also suitable for the production of instantaneous images whereby there is no necessity for placing a shutter in the path of the incident radiation. However, for the reasons mentioned above these known systems are not suitable for use in the longer wave section of the infra-red spectrum.

For many appliactions, e.g. plasma research, night vision equipment and the like, a demand exists for systems of the aforementioned type which respond to long wave infra-red radiation too.

Thus it is an object of this invention to provide an improved arrangement for converting a two-dimensional pattern or image formed by infra-red radiation into a corresponding or similar pattern formed by a radiation of shorter wave-length, especially in the visible range of the electromagnetic spectrum, which arrangement responds to infra-red radiation of longer wavelength than known arrangements of this type.

A further object of the invention is to provide an improved image converter which is able to convert an image formed by infra-red radiation having wavelength of more than about 2 µm. (1 µm.$=10^{-6}$ metre), especially in the approximate range from 10 to 100 µm. into a corresponding visible image.

A further object is to provide an arrangement for producing a visible image of the long-wave infra-red radiation of a solid, liquid or gaseous object, e.g. a plasma discharge.

A still further object is to provide an arrangement for producing a visible image corresponding to the long-wave infra-red absorption characteristic of a solid, liquid or gaseous object, e.g. a plasma discharge.

Briefly, the invention relates to an arrangement for converting a first pattern of a long-wave infra-red radiation into a corresponding second visible light pattern and preferred embodiment of the invention comprises an evacuated envelope; a photo-cathode arrangement positioned in said envelope and comprising an electron emissive material the ratio of the number of emitted electrons to the number of impinging quanta of a radiation of a specific wavelength of which being abnormally strongly dependent or sensitive to changes of temperature within a specific low temperature range; means for maintaining said photo-cathode arrangement within said temperature range, means for directing said first pattern of long-wave infra-red radiation onto said photo-cathode arrangement which is at least coextensive with said pattern; means for focussing said emitted electrons onto means for converting an electron image into a visible image; means for producing radiation of said specific wavelength said radiation producing; means being located with respect to said photo-cathode such that said radiation of said specific wavelength is directed onto said photo-cathode arrangement, and means for controlling time and/or position of incidence of said radiation of said specific wavelength onto said photo-cathode arrangement.

A preferred material for forming said photo-cathode which may comprise a thin vacuum-deposited layer, corresponds to the formula $(Cs)Na_xK_{3-x}Sb$, wherein $x$ may have any value between zero and three, for such a material the said specific wavelength may correspond to a quantum energy of about 2 e.v. (electron volt).

The invention will now be explained more particularly with reference to the drawings:

FIGURE 1 is a somewhat simplified partially sectioned view of a first embodiment of the invention.

FIGURES 2a, 3 and 4 are greatly enlarged sectional views of different photocathodes as used in the system of FIGURE 1 and in the following exemplary embodiments.

FIGURES 5 and 6 illustrate two further embodiments of the invention which employ spot-scanning of the infra-red image.

Figure 6:
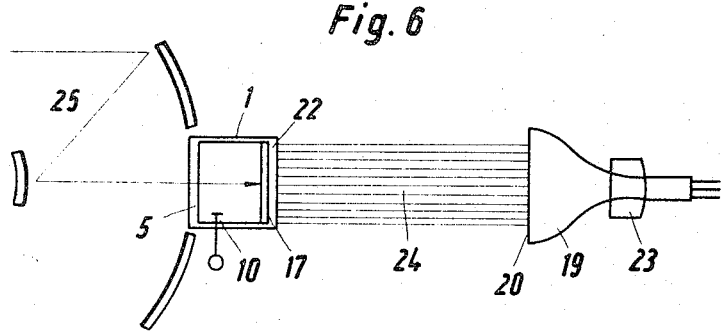

The exemplary embodiment of the invention illustrated in FIGURE 1, includes an evacuated envelope or vessel 1 containing a plane photocathode 2 upon which an infra-red radiator 3 which is to be investigated is reproduced via the schematically illustrated optical system. The evacuated vessel 1 is in this case provided with a window 5 at one end, which is transparent to infra-red rays of the wavelength range in question. The cathode 2 is schematically illustrated only and will be described in greater detail later making reference to FIGURES 2 to 4. The evacuated vessel additionally contains an electron beam generating system 6 of conventional type, comprising a cathode, a control electrode and at least one accelerating electrode. The system illustrated is designed for electrostatic deflection of the electron beam and consequently contains two pairs of deflection plates 7. The beam generating system can be designed on the lines usual with oscilloscope tubes and no further explanation of this is therefore necessary. It produces an electron beam 8 capable of scanning the rear side of the cathode system, e.g. in the manner of a TV scanning pattern. The working voltages and deflection voltages of the beam generating system 6 are supplied by a circuit arrangement 9 of conventional construction.

As will be explained in greater detail later making reference to FIGURE 2, the photocathode system 2 produces photoelectrons in numbers dependent upon the degree of heating produced by the infra-red radiation at the location scanned by the beam 8. These photoelectrons are picked up by an anode 10 biased positively with respect to the photocathode, possibly amplified in an amplifier 11 and fed to a reproducing system, e.g. an oscilloscope 12. The amplified signals picked up from the anode 10, in this context modulate the intensity of the electron beam in the oscilloscope 12 and the deflection of the electron beam is synchronized with the scanning of the photocathode 2 as the line 13 schematically indicates.

The cathode 2 can incorporate an emissive layer containing antimony, caesium and/or other alkali metals, which layer, during operation, is maintained by a schematically illustrated cooling system 14 at a temperature e.g. —150° C., at which the quantum yield from the layer exhibits an abnormally high degree of temperature dependence for radiation of specific wavelength. With cathodes of the (Cs) $Na_xK_{3-x}Sb$ type, radiation having a photon energy of about two electron volts is employed.

Radiation to which the cathode layer is particularly sensitive at the operating temperature, is produced in the example of FIGURE 1 by the electron beam 8. In this context, the cathode system 2, as illustrated in greater detail in FIGURE 2, can consist of a thin carrier 15, transparent to the radiation concerned, e.g., a mica foil one side of which carries a luminescent layer 16 and the other side the actual emissive cathode layer 17. The luminescent phosphor of which the layer 16 is composed is so selected that when excited by the electron beam 8 it emits radiation of that wavelength for which the cathode layer 17 is most sensitive at the operating temperature. The layer 16 can, as required, incorporate several types of phosphor, one type producing when excited a type of radiation for which the cathode layer 17 is not particularly sensitive and a second type converting the radiation emitted by the first phopshor into the desired radiation for which the cathode layer 17 is highly sensitive at the operating temperature. If desired, more than two types of phosphor can be employed and may be used in mixed form or applied in separate layers on top of one another.

Since the image resolution can be impaired by scattering of the light emitted by the phosphor layer 16 in the carrier 15, the phosphor layer 16 and cathode 17 may be arranged on one and the same side of the carrier as illustrated in FIGURE 2a. In this case, the carrier 15 must be transparent as far as the electron beam is concerned and can for instance be a thin aluminum foil.

If the material employed for converting the electron energy into the desired radiation is amendable to the production of self-supporting layers, a cathode system of the type illustrated in FIGURE 3 may be employed. This cathode arrangement consists of a thin plate 15' of a material which serves not only as carrier but converts the electron energy into the desired radiation and carries the actual cathode layer 17 on one of its faces. The self-supporting layer 15 can for instance be made of a semiconductor material the energy band interval for which corresponds to the desired radiation, said interval being about 2 e.v. for a multi-alkali cathode of the abovementioned type. Where the dislocation density is sufficiently high, the lifetime of the excited charge carriers is very short so that immediately after excitation by the electron beam recombination takes place, accompanied by emission of the desired radiation.

It may be appreciated that if there is good heat transfer in a transverse direction across the flat cathode, the image resolution is reduced. To avoid this drawback, as FIGURE 4 shows the cathode can be built up of separate regions 17' in mosaic fashion, each such region consisting of the desired cathode material. If the carrier 15 consists of a material which does not conduct electrically, between it and the mosaic particles 17', a transparent electrically conductive layer 18, e.g. of tin-chloride, is inserted which should as far as possible be a heat insulator. Since the individual regions 17' of the mosaic do not touch one another, there can be no direct heat exchange between them by conduction and the image resolution is accordingly improved.

FIGURE 5 illustrates another embodiment of the invention in which the light spot for scanning the cathode system 2 is produced by an external light source. This light source consists of a cathode ray tube 19 which is constructed and operated in the same fashion as the flying spot tube well known in the television art. An usual raster produced on the screen 20 of the tube is reproduced upon the cathode system 2' via a conventional optical system, this being illustrated schematically in the form of a lens 21. If the radiation produced by the screen 20 has the desired wavelength, then a layer of luminescent material such as the layer 16 on the cathode illustrated in FIGURE 2, is not necessary. However, if desirable or necessary the radiation emitted by the screen 20 may be converted by such a layer 16 into radiation of some other desired wavelength. Otherwise, the system corresponds to that of the exemplary embodiment illustrated in FIGURE 1, the units 9, 11 and 12 having been omitted from FIGURE 5 for the sake of clarity.

The typical embodiment illustrated in FIGURE 6 corresponds in principle to the embodiment of FIGURE 5. The emissive layer 17 is, however, applied to a plate 22 which is transparent for the supplementary radiation, which plate constitutes the back wall of the evacuated vessel 1'. The supplementary radiation is again supplied by a tube 19 of the flying-spot type which may be equipped with magnetic means of beam deflection and possesses a deflection coil system 23. The reproduction of the screen 20 of the tube 19 on the cathode layer 17 is effected in the exemplary embodiment of FIGURE 6 by means of a fiber-optic system 24. The infra-red radiator, which is not illustrated, is reproduced upon the cathode layer 17 via a system of mirrors 25, through the window 5.

In all the exemplary embodiments thus far described, an electrical signal appears at the anode 10, the instantaneous level of which is a measure of the intensity of the infra-red radiation impinging upon that part of the photocathode onto which is impinging the supplementary radiation at the particular instant; this is because the number of photoelectrons emitted is dependent upon the temperature of the particular point on the photocathode, this temperature shifting in accordance with the intensity of infra-red irradiation.

Figure 7:
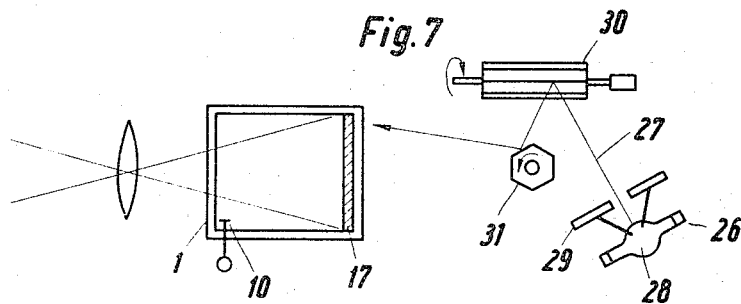
FIGURE 7 illustrate an embodiment similar to that of FIGURE 5 in which, however, the scanning of the photocathode is effected by a beam the deflection means for which are of a mechanical-optical nature.

FIGURE 7 depicts an embodiment corresponding substantially to those of FIGURES 5 and 6 within which the radiation spot scanning the emissive layer 17 is not produced by means of a cathode-ray tube but by a mechanical-optical system. This syste mcomprises a radiation source, designated overall by 26, producing a fine beam. The radiation source 26 can for instance comprise a radiator 28 such as a gas-discharge tube and can incorporate a diaphragm 29 through which only a fine beam 27 can pass. The beam 27 is deflected in two directions by light directing means, that is by two rotary mirrors 30, 31 the axes of which are substantially perpendicular to one another and the drives to which are preferably synchronised, so that the emissive layer is scanned in two coordinate directions. The speeds of the mirrors will preferably be quite different and will in fact have a ratio preferably greater than 10:1, e.g. 100:1 or 300:1. Alternatively, the light directing means may be a lens.

For scanning the emissive layer, it is also possible to employ an optical system operating on the Goos-Hähnchen effect such a system having been described elsewhere.

Figure 8:
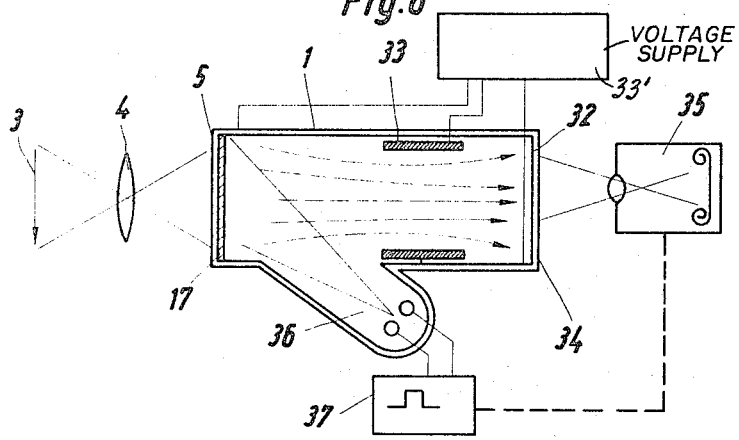
FIGURE 8 is an embodiment of the invention similar to an image converter, and is designed for producing momentary or instantaneous images.

FIGURE 8 illustrates an embodiment of the invention which is similar to a known image converter tube. The emissive layer 17 is applied to the inner wall of the entry window 5 but may also be located on a separated carrier as in FIGURE 1. The rear wall of the evacuated envelope 1 is constituted by an exit window 34 on the interior face of which is applied a layer 32 of luminescent material capable of emitting visible radiation when excited by electron bombardment. The evacuated envelope 1 also contains an electron-optical system 33, supplied by a suitable source 33' which is schematically illustrated only and constructed in the manner familiar with image converter tubes, and may also contain systems for producing an axial D.C. magnetic field. The electron-optical system 33 in known fashion reproduces the electron image furnished by the photocathode 17 on the luminescent layer 32, which latter can then be observed or recorded, e.g. using a film camera 35.

For producing instantaneous pictures of the infra-red radiator 3 displayed on the emissive photo-cathode 17, said cathode is uniformly bombarded with radiation pulses supplied from a source 36. The radiation source 36 can be of any desired design and, for example, may be a gas-discharge tube as illustrated or a spark-gap device etc. The gas-discharge tube, e.g. a rare gas (xenon) flash bulb, is supplied from a voltage source 37 capable of producing voltage pulses. Thus, a visible image only appears on the luminescent layer 32 if the emissive layer 17 is bombarded by radiation from the radiation source 36. In this way, instantaneous pictures of the infra-red radiator can very easily be produced. For photographing picture sequences, the pulse train frequency of the pulses supplied by the source 37 and activating the light source 36, may be synchronized with the frame transport frequency of the film camera 35.

The exemplary embodiments illustrated in FIGURES 5 to 8 should in each case be considered as having a cooling system corresponding to the system 14 of FIGURE 1. However, this system has been left out of these figures to simplify the drawing. The anode 10 is in all cases positively biased to such an extent that as far as possible all the electrons emitted from the photocathode are picked up by it. In place of the simple anode 10, a secondary electron multiplier may be employed. Materials suitable for the entry window 5 include for example intrinsic or p-conducting semiconductors such as germanium, indium-antimonide and so on. In place of the said sources of supplementary radiation, it is of course possible to employ any other suitable known type of radiation source capable of producing radiation of the desired wavelength. In the event that the cathode employed has an abnormal quantum yield/temperature dependence at a shorter wavelength, the radiation sources may be spark-gap devices (heavy metal electrodes) or systems for producing X-rays. For very short wave radiation, the radiation source can be housed in the same envelope as the photocathode, e.g. in a chamber forming an extension of the envelope of the image converter illustrated in FIGURE 8.

Using the system as described hereinbefore, not only can objects producing radiation in the infra-red region be investigated but also the absorption characteristics of objects studied in the infra-red spectrum. In the latter case the object to be examined is irradiated with radiation of a suitable wavelength. This radiation can for instance be produced by means of a maser.

It is evident that not only infra-red radiation patterns but any other radiation (e.g. microwave radiation) or form of energy (e.g. nuclear radiation, sound energy) can be detected by the invention, provided, however, that the energy the pattern of distribution of which being converted into a visible image is able to effect minute changes of the temperature of the cathode layer. However, the preferred application of the invention is the so-called far infra-red between say, 5 or 10 $\mu$m. and about 100 or 500 $\mu$m., which wavelength range is very difficult if not impossible to deal with known image converters and the like.

I claim:

1. A system for producing two-dimensional images of an infra-red radiator emitting radiation causing heating effects on a screen; an evacuated vessel including a window transparent to said radiation; means projecting said radiation corresponding to said infra-red radiator on said vessel; a photocathode located in said vessel producing an electron image in accordance with said radiation projected thereon; means responsive to said electron image to produce a visible image; cooling means cooling said photocathode to a temperature range in which the quantum yield of photoelectrons, emitted by said photocathode upon impingement of supplementary optical radiation is strongly dependent on the temperature of said cathode; a supplementary radiation source producing said supplementary radiation and located for radiation bombardment of said photocathode with photon energy to obtain photoelectrons from said photocathode, the yield of said photoelectrons being sharply modified by selective heating of the cathode due to the infra-red radiation projected thereon by said radiator; and means controlling the incidence of said supplementary radiation on said photocathode.

2. System as claimed in claim 1 wherein said radiation projected onto said vessel has a wavelength in the range of from 5 to $500 \times 10^{-6}$ m. wavelength.

3. System as claimed in claim 1, characterized in that the photocathode is of multi-alkali type, and that the energy of the supplementary radiation is about 2 e.v. and the operating temperature of the photocathode about $-150°$ C.

4. System as claimed in claim 1, characterized in that the supplementary radiation source includes an electron excitable luminescent phosphor.

5. System as claimed in claim 4, characterized in that the luminescent phosphor forms a layer closely adjacent to the photocathode; and wherein an electron beam generating system is located in said evacuated vessel containing the photocathode, said electron beam generating system scanning the beam over the phosphor.

6. System as claimed in claim 1, wherein the supplementary radiation source is a light source illuminating the entire area of the photocathode occupied by the image of the infra-red radiator which is to be reproduced; a fluorescent screen is provided in said evacuated vessel; and an electron-optical system is provided for displaying the electron image emitted by the photocathode on said fluorescent screen.

7. System as claimed in claim 6, wherein the light source is a pulsed light source to produce at least one light pulse.

8. System as claimed in claim 1, wherein said supplementary radiation source includes a mechanical-optical scanning system producing a radiation spot scanning the photocathode.

9. System converting a first pattern of longwave infra-red radiation of over $2 \times 10^{-6}$ m. wavelength into a corresponding visible light pattern, said system comprising an evacuated envelope (1); a photocathode arrangement (17) positioned in said envelope (1) and comprising an electron emissive material, the ratio of the number of emission electrons to the number of impinging quanta of a radiation of a specific wavelength of which being abnormally strongly dependent to changes of temperature within a specific low temperature range;
means for maintaining said photocathode arrangement (17) within said temperature range (14);
means for directing (3, 4, 5) said first pattern of longwave infra-red radiation of over $2 \times 10^{-6}$ m. wavelength onto said photocathode arrangement (17), said photocathode arrangement being at least co-extensive with said pattern;
means for producing radiation (FIGS. 1 and 2: 8, 16; FIG. 5: 19, 20, 21; FIG. 6: 19, 20, 24; FIG. 7: 28, 30, 31; FIG. 8: 36) of said specific wavelength, said radiation producing means being located with respect to said photocathode (17) so that said radiation of said specific wavelength is directed on to said photocathode arrangement (17);
and means for controlling incidence of said radiation of said specific wavelength on to said photocathode arrangement.

10. System as claimed in claim 9 wherein said means for controlling the incidence of said radiation of said specific wavelength includes means scanning (FIG. 1: 6, 7, 9; FIGS. 5, 6 and 7), said photocathode arrangement (17) by said radiation.

11. System as claimed in claim 9 including means for converting (FIG. 8: 32) an electron image into a visible image; means for focusing (33, 33') said emitted electrons onto said converting means (32); and said means for controlling incidence of said radiation of said specific wavelength includes a pulsed light source (36, 37) illuminating the entire photocathode arrangement.

12. System as claimed in claim 9 wherein said radiation projected onto said vessel has a wavelength in the range of from 5 to $500 \times 10^{-6}$ m. wavelength.

References Cited

UNITED STATES PATENTS

| | | | |
|---|---|---|---|
| 2,234,328 | 3/1941 | Wolff | 250—213 X |
| 2,802,963 | 8/1957 | Sheldon | 250—213 X |
| 2,869,024 | 1/1959 | Bruining et al. | 250—213 X |
| 2,879,424 | 3/1959 | Garbuny et al. | 250—213 X |
| 2,927,234 | 3/1960 | Kazan | 250—213 X |
| 3,002,101 | 9/1961 | Anderson et al. | 250—213 X |
| 3,058,021 | 10/1962 | Dunn | 250—213 X |
| 3,110,009 | 11/1963 | Bolton et al. | 250—230 X |

ARCHIE R. BORCHELT, *Primary Examiner.*